Oct. 8, 1968 H. J. CVETKO ET AL 3,405,239

PHONOGRAPH PICKUP HAVING FREE OR OPERATIVE TRANSDUCER POSITIONS

Filed Dec. 31, 1964

INVENTORS
HENRY J. CVETKO
DUANE E. PUNKAR
BY

Francis J. Klempay
ATTORNEY

United States Patent Office 3,405,239
Patented Oct. 8, 1968

3,405,239
PHONOGRAPH PICKUP HAVING FREE OR OPERATIVE TRANSDUCER POSITIONS

Henry J. Cvetko and Duane E. Punkar, Conneaut, Ohio, assignors to The Astatic Corporation, Conneaut, Ohio, a corporation of Ohio Filed Dec. 31, 1964, Ser. No. 422,723
1 Claim. (Cl. 179—100.41)

ABSTRACT OF THE DISCLOSURE

A phonograph pickup cartridge wherein the transducer is mounted in cantilever manner with the fixed end mounted in a soft but resilient elastomeric block wherein the transducer is moved from a free position to an operative position when the stylus tip is applied to a record.

This invention relates to electric phonograph pickup cartridges and more particularly to improvements therein whereby the pressure loading between the phonograph record and the pickup stylus of the cartridge may be drastically reduced while yet insuring acceptable tracking of the stylus in the record groove and the generation of acceptable signal strength. A lowered pressure loading is, of course, highly desirable when reproducing sound from high quality microgroove records, whether monaural or stereophonic, but heretofore attempts to reduce the loading below 6 to 8 grams has been accompanied by severe problems of tracking and adequate signal generation. It is accordingly the primary object of this invention to provide an improved pickup cartridge which can operate at but a few grams of pressure loading, which, nevertheless, has the inherent ability to smoothly and consistently track the record groove and to generate an output signal of acceptable strength.

The above object is accomplished, in accordance with the present invention, by increasing the mechanical compliance of the pickup stylus with respect to the record groove while improving the mounting of the particular transducer used and its coupling arrangement with the stylus so that the transducer is driven at maximum efficiency. More specifically, we provide an improved mechanical arrangement whereby while the stylus tip is most compliant with respect to the record groove the drive between the stylus-carrying arm and the transducer is accomplished under conditions of optimum coupling and balanced opposed floating forces which derives maximum output from the transducer in relation to the limited mechanical energy initially derived from the record groove.

Another object of the invention is to provide an improved pickup cartridge having the characteristics outlined above which is both effective to multiply the signal-generating forces applied to the transducer from the stylus and to minimize the mass reactance of the body of the cartridge and the portion of the tone arm to which it may be attached.

The above and other objects and advantages of the invention will become apparent upon consideration of the following description and the accompanying drawing wherein there are disclosed certain preferred embodiment of the invention.

Figures 1, 2, 3, 4, 5, 6:
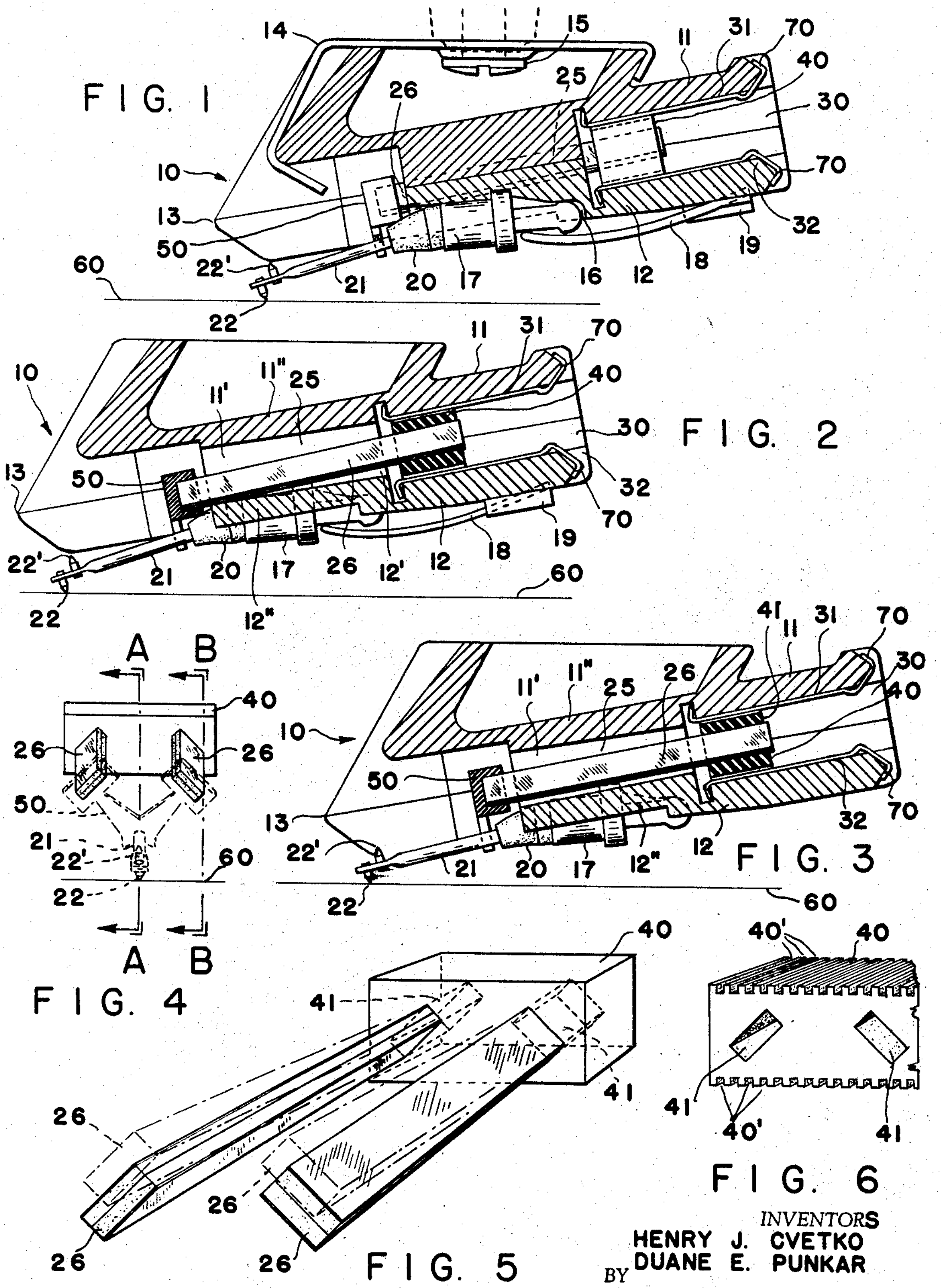
FIGURE 1 is a sectional view taken at the vertical centerline of a pickup cartridge constructed according to the principles of the present invention, the view being taken along the line A—A of FIGURE 4.
FIGURE 2 is a sectional view taken at a vertical plane through the transducer element of a cartridge constructed according to the principles of the present invention, this view being taken along the line B—B of FIGURE 4.
FIGURE 3 is a sectional view similar to FIGURE 2 but showing the cartridge of the invention under a different condition of operation.
FIGURE 4 is a fragmentary view of the transducer elements and clamp pad of the pickup of FIGURE 3.
FIGURE 5 is a perspective view of the transducer elements and clamp pad assembly of the cartridge of the invention.
FIGURE 6 is a fragmentary view of a modified form of the clamp pad of the invention.

Referring now to the drawing more in detail, the reference numeral 10 indicates the pickup cartridge housing generally. Housing 10 comprises an upper housing half 11 and a lower housing half 12 abutting each other on a parting line 13. At final assembly the housing halves 11 and 12 are secured together by cementing, for example, at the parting line 13.

Snapped onto the upper face of upper housing 11, a mounting bracket 14 is provided to secure the cartridge 10 in a phonograph tone arm, not shown, in well known manner as by the screw 15, for example. On the underside of lower housing 12, a molded recess 16 is provided for receiving and journalling a stylus operator 17. A stylus retaining spring 18 is secured to housing 12 rearwardly of recess 16 by a clamp 19. This method of securing and journalling the stylus of the present invention is that disclosed in U.S. Patent 2,848,559 to M. M. Palo.

Attached to the stylus operator 17 is an elastomer bushing 20 which supports a stylus arm 21. The flattened forward end of arm 21 supports a pair of stylus tips 22 and 22'. Stylus tips 22 and 22' may conveniently be made of long-wearing material such as sapphire or diamond, for example, and may be presented for use selectively by turning over the stylus operator 17.

The stylus assembly described is located upon the vertical median plane of the cartridge assembly of the invention at the position indicated by the broken line A—A of FIGURE 4. Symmetrically disposed on each side of the median plane A—A, a pair of cavities 25 are provided to accommodate the two transducer elements 26 of the presently illustrated stereo cartridge assembly. It will be understood that the advantages of the present invention apply in equal measure to monaural cartridges which utilize only a single transducer element. The vertical plane upon which one of the two transducer elements 26 of the presently illustrated genus are located is indicated at the broken line B—B of FIGURE 4. FIGURES 2 and 3 are taken substantially on that plane.

Cavity 25, of which there are two, is formed by the combination of recess 11' in upper housing 11 and recess 12' in lower housing 12. Cavity 25 is closed off in its top edge by the wall 11'' of upper housing 11 and on its bottom edge by the wall 12'' of lower housing 12.

A somewhat larger internal cavity 30 is provided at the right end of the cartridge assembly by the confluence of suitably formed half-cavities in the upper housing 11 and the lower housing 12 respectively. The upper wall 31 and the lower wall 32 of cavity 30 extend a substantial distance transversely of the cartridge and the rearward ends of the two cavities 25 open into the cavity 30.

An elastomer clamp pad 40, which forms the heart of the present invention, is frictionally clamped by the application of carefully controlled pressure between the upper wall 31 and the lower wall 32. One end of each of the two transducer elements 26 is received in one of the pair of rectangular sockets 41 in the clamp pad 40. Transducer elements 26 are thus supported in end-clamped cantilever fashion in the clamp pad 40, they extend forwardly within the cavities 25, and they jointly support, on their outer free ends, a V-shaped coupling member 50. The lower end of the coupling member 50 is suitably notched to embrace the stylus arm 21 at a point adjacent the bushing 20.

Of particular significance to the present invention is the disposition of the sockets 41 in the clamp pad 40. Sockets 41 are disposed at a slight downwardly inclined angle (about 5°) with respect to the upper and lower major faces of the clamp pad 40. Upon initial assembly of the cartridge, the elements 26 are urged downwardly in the cavities 25, as shown in FIGURE 2, and their lower edges rest against the top surface of lower wall 12''. The angular depression of the transducer elements 26 in the clamp pad 40 is shown also in solid lines in FIGURE 5. The condition thus described brings the elastic force of the clamp pad 40 to bear upon the coupling member 50 and to urge it firmly against the stylus arm 21. Absent any upward force on stylus tip 22, the entire stylus assembly hinges about the bushing 20 and projects an unduly large amount below its intended position with respect to the cartridge housing 10. This condition is shown in FIGURES 1 and 2.

When the entire assembly is brought down onto a record surface 60 with a preadjusted vertical force of 2 to 3 grams, as measured at the tip 22, the upward reactive forces thus applied to the front ends of the transducer elements 26 cause them to swing upwardly free of the obstruction presented by the lower wall 12'', and to assume the freely disposed operative position illustrated in FIGURE 3. This operative position of elements 26 is further shown in the broken lines of FIGURE 5.

A plurality of electrical terminals 70 are provided for making contact between the transducer elements 26 and the usual ancillary amplifying equipment, not particularly shown.

A further modification of the novel clamp pad 40 of the present invention is shown in FIGURE 6. In this modification the upper and lower major faces of the pad 40 are provided with ribs 40' in the manner shown to afford a very much limited area of contact upon which the upper wall 31 and the lower wall 32 of cavity 30 will bear in their assembled condition. This affords a further controllable adjustment of the degree of clamping pressure to be applied to the transducer elements 26 in certain preferred cases.

In the pickup cartridges of prior art, it has been the universal custom to secure the clamped ends of piezoelectric transducer elements between clamping or pressure pads of rubber-like material. Wide choice has been exercised in elastomeric materials, all in an effort to impart desirably minimal degrees of stiffness to the system. If the clamp pads of the prior art cartridges are made hard enough to maintain the transducer elements in operative position, then only marginally acceptable degrees of compliance can be achieved. If the clamp pads are made sufficiently soft to give acceptable compliance, then the required support is lacking and the mechanical system may collapse under load.

We have discovered that, by inclining our transducer elements 26 downwardly in their clamp pads 40, by next applying a relatively small degree of initial set-down pressure against the stylus tip 22 and thence to the free end of the elements 26, and then by operating our improved pickup cartridge under only this small amount of vertical pressure; we are able to utilize an elastomer clamp pad 40 which is substantially more compliant than that used in any known device of prior art. The total amount of compressive clamping restraint applied to the clamp pad 40 by the housing walls 31 and 32, and thence to the elements 26, may be further limited by providing the upper and lower faces of the pad 40 with the ribs 40' of FIGURE 6.

Thus we have provided a novel pickup cartridge which achieves the objects initially set forth. By the use of an unusually soft and complaint clamp pad 40, which is made to operate properly only after the application of an initial minimal amount of vertical pressure, we provide a cartridge assembly for use under extremely low orders of needle pressure and with extremely high compliance to intelligence signals. High mechanical compliance is maintained under low mass loading conditions through the use of unexpectedly soft material in the clamp pad 40. The disposition of the elements 26 in the downwardly inclined holes 41 of the clamp pad 40, together with the relatively noncompressive restraint afforded by the pad 40, permits the elements 26 to swing to an operative position without the need for any complicated mechanical hinge element per se.

Having thus described our invention what we claim is:

1. A phonograph pickup cartridge formed of mating top and bottom halves each of which is recessed to provide a longitudinally extending space in the assembled casing, an elastomeric transducer-mounting block clamped in the rear end portion of said space and having a longitudinally extending opening therein, an elongated transducer received within said space and having its rear end portion tightly received in said opening in said block, the longitudinal axis of said opening being downwardly inclined slightly with respect to the center longitudinal axis of said space whereby in a free condition of the parts said transducer is inclined downwardly below its normal operating position, a stylus arm extending generally parallel to said transducer and having its rear end secured to the bottom wall of the bottom half of said casing and extending forwardly of the forward end of said transducer, said arm mounting a record-engaging stylus tip at its forward end and being coupled intermediate its ends to the forward end of said transducer, the arrangement being such that when said cartridge is applied onto a record the leverage of said arm is operative to tilt said transducer into an upper operative position.

References Cited

UNITED STATES PATENTS

| | | | |
|---|---|---|---|
| 2,849,239 | 8/1958 | Dieter | 179—100.41 X |
| 3,054,862 | 9/1962 | Hammond | 179—100.41 |

BERNARD KONICK, *Primary Examiner.*

R. F. CARDILLO, *Assistant Examiner.*